S. W. ADAMY & H. B. WHITTEMORE.
VEHICLE-BRAKE.

No. 171,754.  Patented Jan. 4, 1876.

Witnesses:  Inventors:
P. C. Dieterich  Solomon W. Adamy
Wm. B. Wakeman  and Herbert B. Whittemore
Per: C. H. Watson & Co, Attorneys.

UNITED STATES PATENT OFFICE.

SOLOMON W. ADAMY AND HERBERT B. WHITTEMORE, OF UNION, N. Y.

IMPROVEMENT IN VEHICLE-BRAKES.

Specification forming part of Letters Patent No. 171,754, dated January 4, 1876; application filed December 3, 1875.

*To all whom it may concern:*

Be it known that we, SOLOMON W. ADAMY and HERBERT B. WHITTEMORE, of Union, in the county of Broome and State of New York, have invented certain new and useful Improvements in Wagon-Brakes; and we do hereby declare that the following is a full, clear, and exact description thereof, which will enable others skilled in the art to which it appertains to make and use the same, reference being had to the accompanying drawings and to the letters of reference marked thereon, which form a part of this specification.

The nature of our invention consists in the construction and arrangement of a wagon-brake, as will be hereinafter more fully set forth.

Figure 1:
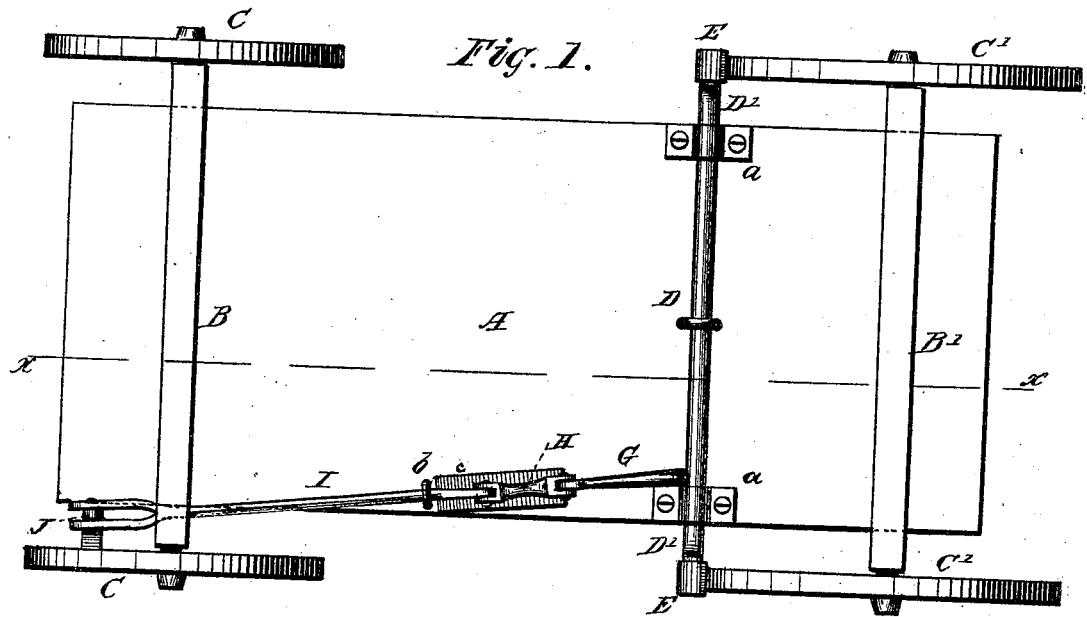
Figure 2:
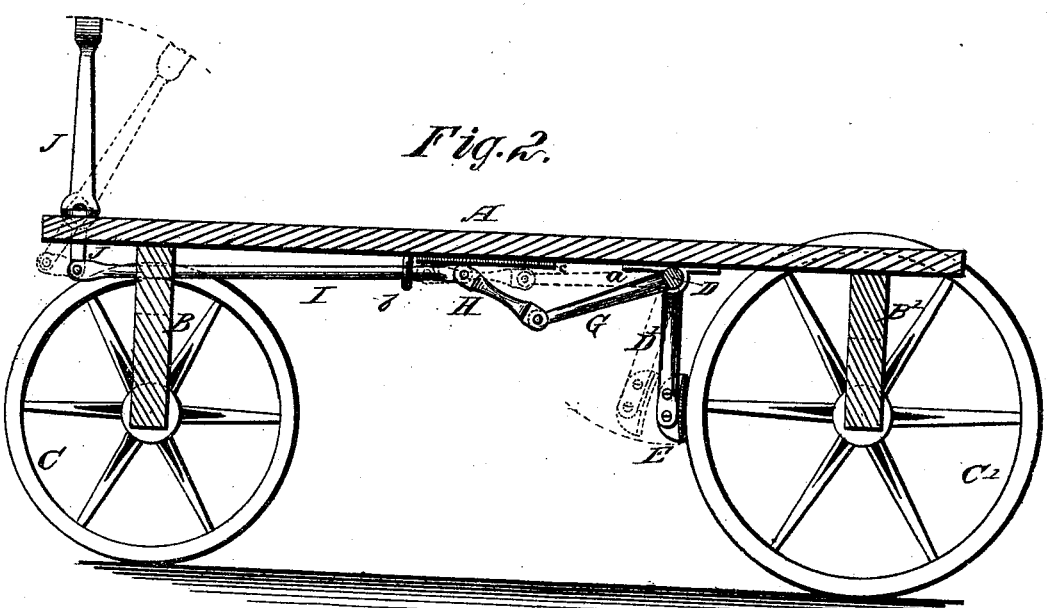

In the annexed drawing, Figure 1 is a bottom-side-up view, and Fig. 2 is central longitudinal section on line $x\ x$, Fig. 1.

A represents the bed of a wagon or carriage with front and rear axles B B', and front and rear wheels C C'. On the under side of the bed A, a suitable distance in front of the rear axle B', are bearings $a\ a$, in which is placed a rock-shaft, D. This shaft is at each end provided with an arm, D', or the ends of the shaft may be bent to form said arms, and to the ends thereof are attached the brake-blocks E E, to bear against the front of the rear wheels C'. The shaft D is also provided with another arm, G, which extends forward under the wagon-bed. The front end of this arm is by a link, H, connected with a rod, I, which passes through a guide, $b$, on the under side of the bed A, and extends forward to near the front end thereof. The rod I is forked at its forward end, and in the same is pivoted the lower end of a handle or lever, J, which is pivoted to the side of the bed A.

By throwing the handle or lever J forward the rod I is pushed backward, and by means of the pivoted link H and arm G the shaft D is thereby turned so as to throw the brake-blocks E against the wheels. By means of the link H such a purchase is obtained that the brakes may be applied heavy or light, as desired, and there is no liability of slipping.

On the under side of the body of the wagon is a roughened plate, $c$, and when the brake is applied the upper rounded head of the link H comes in contact with this plate, and the brake is held to the wheel, and when the brake is released from the wheel the link H is on a line with the rod I and arm G, and the brake is held from the wheel.

Having thus fully described our invention, what we claim as new, and desire to secure by Letters Patent, is—

The shaft D, having arm G, in combination with the rod I and link H, having upper rounded head and the roughened plate $c$ on the under part of the body $a$, all arranged and constructed as and for the purpose specified.

In testimony that we claim the foregoing as our own we affix our signature in presence of two witnesses.

SOLOMON W. ADAMY.
HERBERT B. WHITTEMORE.

Witnesses:
JESSE E. LE BARRON,
MARTIN C. ROCKWELL.